Nov. 23, 1965　　　W. K. KAISER　　　3,219,585
DIFFUSION TECHNIQUE FOR MAKING COMPOSITE OPTICAL MASER CRYSTALS
Filed Oct. 31, 1961

INVENTOR
W.K. KAISER
BY
ATTORNEY

United States Patent Office 3,219,585
Patented Nov. 23, 1965

3,219,585
DIFFUSION TECHNIQUE FOR MAKING COMPOSITE OPTICAL MASER CRYSTALS
Wolfgang K. Kaiser, Summit, N.J., assignor to Bell Telephone Laboratories, Incorporated, New York, N.Y., a corporation of New York
Filed Oct. 31, 1961, Ser. No. 149,106
4 Claims. (Cl. 252—301.1)

This invention relates to a procedure for making composite crystals. More particularly, it concerns a simple yet effective method for obtaining crystal structures for use as optical maser elements.

A composite maser crystal structure comprising a rod having concentric inner and outer portions having different optical characteristics provides significant operational advantages as an optical maser element. This construction and the advantages attributable thereto are set forth in detail in the application of G. E. Devlin and A. L. Schawlow Serial No. 121,409, filed October 25, 1960, now United States Patent 3,087,374, issued April 30, 1963.

Other promising cavity designs, disclosed and claimed in the application of A. G. Fox Serial No. 64,885, now United States Patent 3,140,451, issued July 7, 1964 and the application of C. G. B. Garrett Serial No. 64,879, both filed October 25, 1960, make use of total internal reflections of electromagnetic wave modes propagating in a peripheral path. Specifically, these designs include spheres and cylinders. The advantage of using cavity designs which rely for their operation on total internal reflections is a significant increase in the cavity efficiency Q, since the reflection coefficient at the interface is substantially higher than that obtainable with silvered or dielectric reflectors.

It is characteristic of the latter type of cavity that only the external portion of the crystal is needed to accommodate the peripherally propagating mode. Accordingly, the internal portion of the crystal is not required to be absorbing in the same manner as the active exterior shell. Since heating of the crystal is a significant problem, there is a distinct advantage in constructing the crystal cavity such that the interior or unused portion of the crystal is transparent to the pump radiation. A particularly desirable cavity design, therefore, is a composite crystal wherein the unused portion is transparent to the pump energy and the external shell is absorbing.

All of the aforementioned composite optical maser crystal structures can be made according to the procedure of this invention. This procedure involves doping the entire crystal with an ion in a first valence state and reacting a desired portion of the crystal with a reactant selected to convert the ion species to an active or absorbing valence state or an inactive or transparent valence state according to the ultimate structure desired.

More specifically, in constructing the composite rod with an active interior portion and a transparent shell, the entire rod is doped with an absorbing ion and thereafter reacted with a reducing or oxidizing agent capable of converting the active ion into a transparent valence state by diffusion of the reactant into the exterior portion of the rod. The depth of diffusion determines the ultimate ratio between the diameters of the active and transparent portions.

As applied to the composite cylinder or sphere, this procedure is identical in theory but somewhat opposite in practice. Here it is desired to obtain a crystal with an inactive interior portion and an active shell. Thus, the initial doping is with an inactive or transparent ion species and the conversion is to an active or absorbing state. The manipulative procedures are otherwise identical.

These and other aspects of the invention may be more readily appreciated from the drawing in which.

Figure 1:
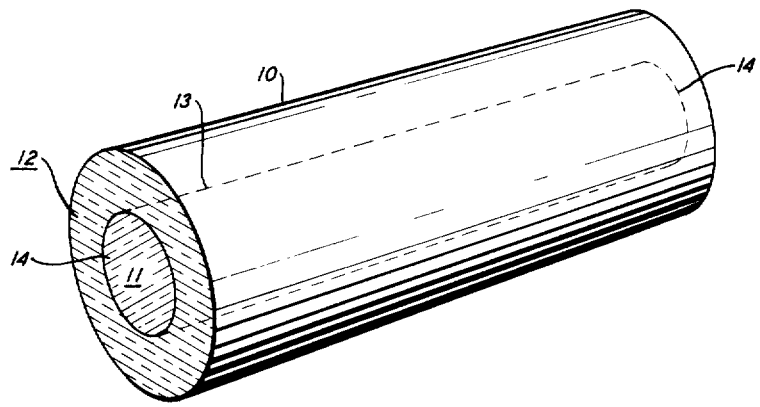
FIG. 1 is a perspective view of a composite crystal rod fabricated in accordance with the novel teachings of the invention.

FIG. 1 shows the composite rod 10 comprisng the inner active portion 11 and the outer transparent shell 12. The interface 13 according to this invention is the depth of diffusion of the reactant. The end faces 14 of the active portion are silvered to obtain the necessary reflections of the stimulated energy.

Figure 2:
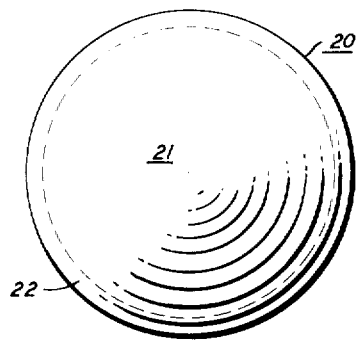
FIG. 2 is a perspective view of a spherical composite structure fabricated by the technique of the invention.

FIG. 2 illustrates a typical spherical cavity having the composite structure obtainable with this invention. FIG. 2 shows a polished spherical crystal 20 having an interior portion 21 which consists of an ion in a valence state that is transparent to the pump radiation. The exterior or skin portion 22 consists of the same general material; however, the absorbing ion is in an absorbing valence state. The oscillating modes are confined to a peripheral path entirely within the exterior shell 22.

Figure 3:
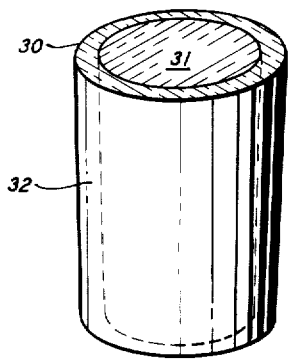
FIG. 3 is a perspective view of a cylindrical composite crystal also constructed according to the invention.

FIG. 3 shows a composite cylindrical crystal which follows the same general structure and operation as the sphere of FIG. 2. This figure shows the composite crystal 30 consisting of the inactive interior portion 31 and the absorbing exterior shell portion 32.

Whereas portions 12, 21 and 31 are referred to as transparent, thus implying a colorless ion species, it is to be understood that this inactive portion may also consist of an absorbing or colored ion species as long as the frequency of absorption is significantly removed from the frequency of the energy required to pump the active interior portion. For most maser materials currently being considered the available stable valence states for the emitting ion other than the active state are colorless. However, an appropriate limitation to be imposed is that the maxima of the absorption bands of the two portions be separated by at least 500 wave numbers.

The following examples are offered by way of specific illustration of the procedure of this invention:

Example I

A single crystal rod of $CaF_2$ doped with 0.05% of $Sm^{2+}$ was heated at atmospheric pressure in gaseous HF at 1100° C. The crystal rod had an approximate diameter of 5 mm. and was 3 cm. long. After heating for 30 hours the crystal had a colorless outer shell portion and a green interior portion. The geometry was essentially that of FIG. 1 the diameter of the active portion 11 being 2 mm. after treatment. This material, $Sm^{2+}$ in $CaF_2$, is a known optical maser material and is described in Physical Review, vol. 123, page 766 (1961).

Example II

The procedure of Example I was followed using pure dry $O_2$ as the reactant. Essentially the identical results as in Example I were observed.

Example III

A single crystal rod of $CaF_2$ doped with 0.05% of $U^{3+}$ was heated at atmospheric pressure in gaseous HF at 1200° C. The crystal rod was approximately the same size as the crystal in the previous examples. Heating was continued for 2 hours, after which the crystal was found to have a red interior portion and a colorless outer shell with a thickness of ½ mm. This maser material, uranium doped calcium fluoride, is described by P. P. Sorokin and M. J. Stevenson, Physical Review Lett., vol. 5, page 557 (1960).

*Example IV*

The procedure of Example III was followed using dry $O_2$ as the reactant. The results obtained were essentially identical to those of Eaxmple III except that greater definition was observed between the interior and exterior portions.

*Example V*

This example is included to illustrate the application of the procedure of this invention to another geometry, specifically, the spherical cavity of FIG. 2. This example additionally shows the use of a reducing agent rather than the oxidizers of the previous specific embodiments.

A polished spherical crystal approximately 2 mm. in diameter and consisting of $CaF_2$ with a 0.05% $Sm^{3+}$ is heated in pure dry $H_2$ for one hour at 1000° C. The crystal is initially colorless. After treatment the crystal exhibits a thin skin of green coloring around its entire exterior to a depth of approximately 40 mils. The resulting green coloring evidences the conversion of $Sm^{3+}$ to $Sm^{2+}$ in the external portion of the crystal.

It will be apparent to those skilled in the art that the procedure of this invention is well suited to a variety of solid state maser materials. It is only essential that the active emitting ion possess a stable valence state, other than the active state, which is essentially transparent to the useful pumping energy.

For instance, europium has at least two available stable valence states, 2+ and 3+, the 3+ state being the active emitting ion species. (See the application of Garrett-Kaiser Serial No. 64,884, filed October 25, 1960.)

It is obvious that since the essential feature of this invention involves the conversion of the active ion, the compoistion of the host lattice is generally immaterial. Such host lattices as $BaF_2$ and $SrF_2$ are given by way of example.

The frequency ranges considered in connection with optical maser materials extend from the far infrared through the ultraviolet and encompass a general range of wavelengths of 100 Angstroms to $2.10^6$ Angstroms.

Various oxidizing and reducing agents are available for performing the desired conversion. All such reactants capable of performing the oxidation or reduction reaction which forms a basis for this invention are considered within the scope of the present invention.

Various other modifications and extensions of this invention will become apparent to those skilled in the art. All such variations and deviations which basically rely on the teachings through which this invention has advanced the art are properly considered within the spirit and scope of this invention.

What is claimed is:

1. A method for making a composite crystal rod of calcium fluoride having an active laser cylindrical inner portion doped with $Sm^{+2}$ and an inactive concentric exterior shell portion doped with $Sm^{+3}$ which is transparent to radiation with which the laser material is pumped which comprises chemically converting the samarium in the said exterior shell portion of the crystal rod from a +2 valence state exhibiting the desired laser absorption to a +3 valence state which is essentially transparent to the said pumping radiation by diffusing HF into the cylindrical surface of the crystal rod and continuing the diffusion until the desired outer portion is substantially converted.

2. A method for making a composite crystal rod of calcium fluoride having an active laser cylindrical inner portion doped with $U^{+3}$ and an inactive concentric exterior shell portion doped with $U^{+4}$ which is transparent to radiation with which the laser material is pumped which comprises chemically converting the uranium in the said exterior shell portion of the crystal rod from a +3 valence state exhibiting the desired laser absorption to a +4 valence state which is essentially transparent to the said pumping radiation by diffusing HF into the cylindrical surface of the crystal rod and continuing the diffusion until the desired outer portion is substantially converted.

3. A method for making a composite calcium fluoride structure wherein the inner portion of the crystal is doped with $Sm^{+3}$ and is transparent to a given pump frequency and the exterior active portion is doped with $Sm^{+2}$ and is absorbing to the same pump frequency which comprises converting $Sm^{+3}$ in the outer portion of the crystal from a valence of +3 to a valence of +2 by diffusing $H_2$ into the outer portion of the crystal and continuing the diffusion until the desired outer portion is substantially converted.

4. A method for making a composite calcium fluoride structure wherein the inner portion of the crystal is doped with $U^{+4}$ and is transparent to a given pump frequency and the exterior active portion is doped with $U^{+3}$ and is absorbing to the same pump frequency which comprises converting $U^{+4}$ in the outer portion of the crystal from a valence of +4 to a valence of +3 by diffusing $H_2$ into the outer portion of the crystal and continuing the diffusion until the desired outer portion is substantially converted.

References Cited by the Examiner

Crystals for Microwave & Optical Masers, Rober D. Olt, publication Electronics, vol. 34, No. 18, pp. 88–91, 5/5/61.

Electronic newsletter "Electronics," vol. 33, Optical Masers use doped $CaF_2$, 12/23/60.

Guggenheim Single Crystal Fluoride, Journal of Applied Physics, vol. 32, #7, July 1961. (Copy in Scientific Library, pp. 1337, 1338.)

IBM Journal of Research & Development, vol. 5, 1/61, Solid State Optical Maser Using Divalent Samarium in $CaF_2$. Letter to the Editor.

Kaiser et al.: Optical Maser effect in $CaF_2$: Sm Physical Review, vol. 123, #3, August 1961, pp. 766–776.

Turnable Source of Radition, "Optical Masers Nature," vol. 191, 8/19/61, pp. 795, 796.

TOBIAS E. LEVOW, *Primary Examiner.*

RICHARD D. NEVIUS, MAURICE A. BRINDISI.
*Examiners.*